(12) United States Patent
Asakawa et al.

(10) Patent No.: US 7,153,907 B2
(45) Date of Patent: Dec. 26, 2006

(54) COMPOSITION FOR FLUORORESIN POWDER COATING MATERIAL

(75) Inventors: Akihiko Asakawa, Ichihara (JP); Masaru Yamauchi, Ichihara (JP); Sho Masuda, Ichihara (JP); Masao Unoki, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 320 days.

(21) Appl. No.: 10/806,103

(22) Filed: Mar. 23, 2004

(65) Prior Publication Data

US 2004/0176543 A1 Sep. 9, 2004

Related U.S. Application Data

(63) Continuation of application No. PCT/JP02/10056, filed on Sep. 27, 2002.

(30) Foreign Application Priority Data

| Sep. 27, 2001 | (JP) | ............................. 2001-295296 |
| Dec. 18, 2001 | (JP) | ............................. 2001-384426 |
| Dec. 25, 2001 | (JP) | ............................. 2001-391622 |

(51) Int. Cl.
C08F 8/30 (2006.01)
(52) U.S. Cl. .................. 525/123; 525/199; 525/200; 525/326.3; 525/382; 525/384; 525/386
(58) Field of Classification Search ............... 525/123, 525/199, 200, 326.3, 382, 384, 386
See application file for complete search history.

(56) References Cited

U.S. PATENT DOCUMENTS

| 3,758,634 A | | 9/1973 | Labana et al. | |
| 3,943,082 A | | 3/1976 | Smith et al. | |
| 4,914,158 A | * | 4/1990 | Yoshimura et al. | ......... 525/199 |
| 5,147,934 A | | 9/1992 | Ito et al. | |
| 5,346,727 A | * | 9/1994 | Simkin | ....................... 427/486 |
| 5,405,912 A | * | 4/1995 | Simkin | ....................... 525/199 |
| 5,439,896 A | | 8/1995 | Ito et al. | |
| 5,498,663 A | | 3/1996 | Shimada et al. | |
| 5,593,730 A | * | 1/1997 | Satgurunathan et al. | .... 427/386 |
| 6,121,408 A | | 9/2000 | Aoki et al. | |
| 6,140,410 A | * | 10/2000 | Kolouch | ...................... 524/520 |
| 6,166,138 A | * | 12/2000 | Kolouch | ...................... 525/166 |

FOREIGN PATENT DOCUMENTS

| GB | 1 424 967 | 2/1976 |
| JP | 48-28550 | 4/1973 |
| JP | 50-16722 | 2/1975 |
| JP | 50-51539 | 5/1975 |
| JP | 51-57725 | 5/1976 |
| JP | 51-82321 | 7/1976 |
| JP | 63-264675 | 11/1988 |
| JP | 64-1770 | 1/1989 |
| JP | 1-103670 | 4/1989 |
| JP | 4-214771 | 8/1992 |
| JP | 10-88034 | 4/1998 |
| JP | 2001-123104 | 5/2001 |
| WO | WO 03/029368 | 4/2003 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

A composition for fluororesin powder coating material, with which a coating film having an excellent matte effect is obtainable without impairing features of fluororesins including excellent weather resistance, and a process for its production, are presented. The composition for fluororesin powder coating material comprises at least two curing systems each comprising a fluororesin having crosslinkable sites and a curing agent reactive to the crosslinkable sites, wherein the respective curing systems substantially independently react and crosslink, and the crosslinking reaction time of one curing system is different by at least 20 seconds from the crosslinking reaction time of other curing system(s).

10 Claims, No Drawings

COMPOSITION FOR FLUORORESIN POWDER COATING MATERIAL

TECHNICAL FIELD

The present invention relates to a composition for fluororesin powder coating material.

BACKGROUND ART

A thermosetting fluororesin coating material is excellent in weather resistance, and because of this feature, it is widely used for bridges, gates, fences, building materials such as siding materials for houses, automobile bodies, and household electric appliances. As a coating film applied by coating, from an aesthetical viewpoint, there may be a case where gloss is required or a case where matting is required. Particularly, in recent years, a demand for a matte coating material has increased as it presents a high-grade appearance.

On the other hand, a powder coating material has a feature that it is solvent free, and its application range has been expanded in recent years, as consciousness for environmental protection has increased. Especially, a fluororesin powder coating material is capable of meeting a demand for maintenance free by virtue of the weather resistance performance which the fluororesin specifically has, and its applications are expected to increase.

With such a powder coating material, it has heretofore been common to employ a method wherein pigment particles of e.g. white carbon are added to present fine irregularities on the surface, or a method wherein wax or the like which is likely to bleed out on the surface, is added to provide a thin layer made of wax or the like on the coating film surface.

Further, JP-A-64-1770 proposes a resin composition for powder coating material comprising a polyester having a hydroxyl value of at least 1200 geq/$10^6$, a polyester having a hydroxyl value of from 200 to 1000 geq/$10^6$ and a blocked isocyanate curing agent, wherein the difference in gelation time between the two polyesters is at least 3 minutes. Further, JP-A-4-214771 proposes a resin composition for powder coating material comprising a polyester A having an acid value of at least 1200 geq/$10^6$, which is not substantially gelled, a polyester B having an acid value of from 200 to 1000 geq/$10^6$, which is not substantially gelled, and a triglycidyl isocyanate curing agent, wherein the difference in gelation time between the two polyesters is at least 3 minutes.

However, in the method of adding white carbon, pigment particles are present substantially on the coating film surface, and in the method of adding wax, the coating film surface is not a fluororesin, whereby there has been a problem that as compared with a coating film made of a fluororesin itself, the weather resistance performance is inferior. Further, so long as the above-mentioned methods are employed, the 60° specular gloss value can not be lowered to a level of 40%, and it has been very difficult to obtain a smooth coating film surface having a gloss of not higher than 40% which is desired in many cases.

In the resin composition disclosed in JP-A-64-1770 and in the resin composition disclosed in JP-A-4-214771, in order to obtain a matte effect, the acid value or the hydroxyl value of one of the polyester resins is made considerably high. Nevertheless, as they are made of polyesters, they are obliged to be poor in weather resistance. Further, when the two resins have the same type of functional groups, the matte effect tends to be inadequate.

DISCLOSURE OF THE INVENTION

Under these circumstances, the present inventors have conducted an extensive study and as a result, they have found a composition for fluororesin powder coating material which is free from the above-described drawbacks and with which a coating film having an excellent matte effect is obtainable without impairing the feature of a fluororesin including excellent weather resistance, and thus have arrived at the present invention.

Namely, the gist of the first invention in the present invention is a composition for fluororesin powder coating material, which comprises at least two curing systems each comprising a fluororesin having crosslinkable sites and a curing agent reactive to the crosslinkable sites, wherein the respective curing systems substantially independently react and crosslink, and the time required for the relative dynamic viscoelasticity Er' to increase by 5% from the initial value by curing at 190° C. (the crosslinking reaction time) of at least one curing system is different by at least 20 seconds from the crosslinking reaction time of other curing system(s).

Further, the gist of the second invention in the present invention is a composition for fluororesin powder coating material, which comprises the following particles (1) and the following particles (2), wherein the particles (1) and the particles (2) are different in their curing temperatures by at least 8° C., and the particles (1) and the particles (2) are substantially independently contained:

The particles (1) are particles for fluororesin powder coating material comprising a fluororesin (A) having hydroxyl groups and a curing agent (α) having a functional group reactive to the hydroxyl groups; and the particles (2) are particles for fluororesin powder coating material comprising a fluororesin (A) having hydroxyl groups and a curing agent (α) having a functional group reactive to the hydroxyl groups, wherein the combination of the fluororesin (A) and the curing agent (α) is different from the combination in the particles (1);

provided that here the curing temperature is meant for a temperature at which the heat generation peak based on the reaction between the functional groups of the curing agent (α) and the hydroxyl groups of the fluororesin (A) starts to rise by the differential scanning calorimetry (DSC) of the particles for fluororesin powder coating material.

Further, the gist of the third invention in the present invention is a composition for fluororesin powder coating material, which comprises the following particles (3) and the following particles (4), wherein the particles (3) and the particles (4) are different in their curing temperatures by at least 15° C., and the particles (3) and the particles (4) are substantially independently contained:

The particles (3) are particles comprising a fluororesin (B) having 1,2-epoxy groups and a curing agent (β) capable of curing the fluororesin (B); and the particles (4) are particles comprising a fluororesin (B) having 1,2-epoxy groups and a curing agent (β) capable of curing the fluororesin (B), wherein the combination of the fluororesin (B) and the curing agent (β) is different from the combination in the particles (3);

provided that here the curing temperature is meant for a temperature at which the heat generation peak based on the curing reaction between the curing agent (β) and the fluororesin (B) starts to rise by the differential scanning calorimetry (DSC) of the particles (3) and (4).

Further, the gist of the fourth invention is a process for producing a composition for fluororesin powder coating material, which comprises preparing the following particles (1) and the following particles (2) independently and then, mixing the particles (1) and the particles (2):

The particles (1) are particles for fluororesin powder coating material comprising a fluororesin (A) having hydroxyl groups and a curing agent ($\alpha$) having a functional group reactive to the hydroxyl groups; and the particles (2) are particles for fluororesin powder coating material comprising a fluororesin (A) having hydroxyl groups and a curing agent ($\alpha$) having a functional group reactive to the hydroxyl groups, wherein the combination of the fluororesin (A) and the curing agent ($\alpha$) is different from the combination in the particles (1);

provided that here the curing temperature is meant for a temperature at which the heat generation peak based on the reaction between the functional groups of the curing agent ($\alpha$) and the hydroxyl groups of the fluororesin (A) starts to rise by the differential scanning calorimetry (DSC) of the particles for fluororesin powder coating material.

Further, the gist of the fifth invention is a process for producing a composition for fluororesin powder coating material, which comprises preparing the following particles (3) and the following particles (4) independently and then, mixing the particles (3) and the particles (4):

The particles (3) are particles comprising a fluororesin (B) having 1,2-epoxy groups and a curing agent ($\beta$) capable of curing the fluororesin (B); and the particles (4) are particles comprising a fluororesin (B) having 1,2-epoxy groups and a curing agent ($\beta$) capable of curing the fluororesin (B), wherein the combination of the fluororesin (B) and the curing agent ($\beta$) is different from the combination in the particles (3);

provided that here the curing temperature is meant for a temperature at which the heat generation peak based on the curing reaction between the curing agent ($\beta$) and the fluororesin (B) starts to rise by the differential scanning calorimetry (DSC) of the particles (3) and (4).

BEST MODE FOR CARRYING OUT THE INVENTION

In the present invention, the fluororesin is a fluororesin having crosslinkable sites and is preferably one having fluorinated polymerized units (x) obtained by polymerizing a fluoromonomer (X) having an ethylenic unsaturated group.

Such a fluoromonomer (X) may, for example, be a fluoroolefin such as tetrafluoroethylene, hexafluoropropylene, perfluorobutene-1, perfluorohexene-1, perfluorononene-1, chlorotrifluoroethylene, trifluoroethylene or vinylidene fluoride, a perfluoro(alkyl vinyl ether) such as perfluoro(methyl vinyl ether), perfluoro(ethyl vinyl ether), perfluoro(propyl vinyl ether) or perfluoro(heptyl vinyl ether), or a (perfluoroalkyl)ethylene such as (perfluoromethyl)ethylene or (perfluorobutyl)ethylene. Such a fluoromonomer (X) may suitably be selected depending upon the nature required for the coating film, the copolymerizable component or the combination with a curing agent.

Such fluoromonomers (X) may be used alone or in combination as a mixture of two or more of them. As such a fluoromonomer (X), a fluoroolefin having from 2 to 3 carbon atoms is preferred, and particularly preferred is a fluoroethylene such as tetrafluoroethylenei chlorotrifluoroethylene or vinylidene fluoride.

In the present invention, the crosslinkable sites are meant for functional group portions which bring about crosslinked structures by reaction with a curing agent, and they may, for example, be hydroxyl groups, carboxyl groups, amide groups, amino groups, mercapto groups, glycidyl groups, halogen atoms such as bromine or iodine, isocyanate groups or hydrolysable silyl groups.

As a method for introducing the crosslinkable sites, any known method may be employed. However, the fluororesin in the present invention is preferably one having polymerized units (z) having crosslinkable sites. The polymerized units (z) are preferably ones obtainable by polymerizing a polymerizable monomer (Z) having a crosslinkable site. The polymerizable monomer (Z) may be a monomer having a functional group which can be converted to the crosslinkable site.

The polymerizable monomer (Z) may, for example, be a monomer having, for example, a hydroxyl group, a carboxyl group, an amide group, an amino group, a mercapto group, a glycidyl group, or an isocyanate group or a hydrolysable silyl group.

For example, the polymerizable monomer (Z) having a hydroxyl group may, for example, be an alkenyl alcohol such as allyl alcohol; a hydroxyalkyl vinyl ether such as hydroxyethyl vinyl ether, hydroxypropyl vinyl ether, hydroxybutyl vinyl ether or hydroxycyclohexyl vinyl ether; an ester of a hydroxyalkylcarboxylic acid with a vinyl alcohol, such as vinyl hydroxyacetate, vinyl hydroxypropionate, vinyl hydroxybutyrate, vinyl hydroxyvalerate or vinyl hydroxycyclohexanecarboxylate; a hydroxyalkyl allyl ether such as hydroxyethyl allyl ether, hydroxypropyl allyl ether, hydroxybutyl allyl ether or hydroxycyclohexyl allyl ether; a hydroxyalkyl allyl ester such as hydroxyethyl allyl ester, hydroxypropyl allyl ester or hydroxybutyl allyl ester; a hydroxyalkyl (meth)acrylate such as hydroxyethyl acrylate, hydroxypropyl acrylate or 2-hydroxyethyl methacrylate, or a compound having such a monomer partially fluorinated.

The polymerizable monomer (Z) having a carboxyl group may, for example, be undecylenic acid, (meth)acrylic acid (the (meth)acrylic acid will hereinafter generally represent acrylic acid and methacrylic acid, and the same applies to other acrylic acid derivatives), or a carboxylalkyl allyl ether.

The polymerizable monomer (Z) having an amide group may, for example, be (meth)acrylamide or N-methylolacrylamide.

The polymerizable monomer (Z) having an amino group may, for example, be an aminoalkyl vinyl ether or an aminoalkyl allyl ether.

Further, the polymerizable monomer (Z) having a glycidyl group may, for example, be glycidyl (meth)acrylate, glycidyl vinyl ether or glycidyl allyl ether.

The polymerizable monomer (Z) having an isocyanate group may, for example, be vinyl isocyanate or isocyanate ethyl acrylate.

As the monomer which presents the above-mentioned crosslinkable sites, a vinyl or allyl compound is preferably employed, and particularly preferred is a vinyl ether compound, from the viewpoint of the copolymerizability with a fluoroolefin.

The fluororesin in the present invention may have fluorinated polymerizable units (x) and polymerized units (y) other than polymerized units (z) having crosslinkable sites. Such polymerized units (y) are preferably polymerized units based on a polymerizable monomer (Y) other than the fluoromonomer (X) and the polymerizable monomer (Z) having a crosslinkable site. The polymerizable monomer (Y) is a monomer copolymerizable with the above two types of components, which is capable of lowering the melting point or the glass transition point of the fluororesin to improve the coating efficiency and capable of imparting suitable hardness and flexibility to the coating film. The polymerizable monomer (Y) is preferably a polymerizable monomer wherein hydrogen atoms bonded to carbon atoms constituting an ethylenically unsaturated group, are not substituted by fluorine atoms. Such a polymerizable monomer (Y) may, for example, be a polymerizable monomer having a polymerizable site such as a (meth)acryloyl group, a vinyl group, an allyl group or an isopropenyl group.

The polymerizable monomer (Y) may, for example, be a vinyl ether, an olefin, an allyl ether, a vinyl ester, an allyl ester, a (meth)acrylate, an isopropenyl ether, an isopropenyl ester, a crotonic acid ester and other polymerizable monomers. Among them, a compound having a $C_{1-15}$ linear, branched or alicyclic alkyl group, is preferred.

Polymerizable monomers (Y) may be used alone or in combination as a mixture of two or more of them. The following compounds may be mentioned as specific polymerizable monomers (Y).

An alkyl vinyl ether such as methyl vinyl ether, ethyl vinyl ether, butyl vinyl ether, isobutyl vinyl ether, cyclohexyl vinyl ether, chloroethyl vinyl ether or a (perfluoroalkyl) vinyl ether, an alkyl isopropenyl ether such as methyl isopropenyl ether, a fatty acid isopropenyl ester, an olefin such as ethylene, propylene, 1-butene, isobutylene or cyclohexene, a styrene monomer such as styrene or α-methylstyrene, an alkyl allyl ether such as methyl allyl ether, ethyl allyl ether, butyl allyl ether or cyclohexyl allyl ether, a fatty acid vinyl ester such as vinyl acetate, vinyl propionate, vinyl butyrate, vinyl isobutyrate, vinyl valerate, vinyl hexanoate, vinyl octanoate, Veova 9 and Veova 10 (tradenames, for vinyl esters of branched fatty acids having 9 or 10 carbon atoms, manufactured by Shell Chemical Co.), or vinyl versatate, a fatty acid allyl ester such as allyl propionate or allyl acetate, a (meth)acrylate such as methyl (meth)acrylate, ethyl (meth)acrylate, butyl (meth)acrylate or cyclohexyl (meth)acrylate, a (meth)acrylic acid amide such as (meth)acrylic acid amide, a cyano group-containing monomer such as acrylonitrile or 2,4-dicyanobutane-1, a diene such as isoprene or butadiene, a halogenated olefin such as vinyl chloride or vinylidene chloride or a polymerizable monomer having a polyoxyalkylene chain and having a molecular weight of from 100 to 3000, may, for example, be mentioned.

Among them, as the polymerizable monomer (Y), a polymerizable monomer selected from alkyl vinyl ethers, fatty acid vinyl esters, alkyl allyl ethers, fatty acid allyl esters, alkyl isopropenyl ethers and fatty acid isopropenyl esters, is preferred, and particularly preferred is an alkyl vinyl ether.

As the curing agent to be used in the present invention, a compound which reacts with the above-mentioned crosslinkable site to form a crosslinkage, is used.

In a case where the crosslinkable sites are hydroxyl groups, as the curing agent, a compound having an isocyanate group or a carboxyl group, or a melamine resin, may, for example, be used.

In a case where the crosslinkable sites are carboxyl groups, as the curing agent, a compound having a hydroxyl group, an amino group, an isocyanate group or a glycidyl group, may, for example, be used.

In a case where the crosslinkable sites are amino groups, as the curing agent, a compound having a carboxyl group, a glycidyl group or an isocyanate group, may, for example, be used.

In a case where the crosslinkable sites are glycidyl groups, as the curing agent, a compound having a hydroxyl group, a carboxyl group, an amino group, an amide group, an isocyanate group or a hydrazide group, may, for example, be used.

In a case where the crosslinkable sites are isocyanate groups, as the curing agent, a compound having a hydroxyl group, a carboxyl group or an amino group, may, for example, be used.

The compound having an isocyanate group may, for example, be a blocked isocyanate compound, for example, a polyisocyanate compound such as isophorone diisocyanate, tolylene diisocyanate, xylylene diisocyanate, 4,4'-diphenylmethane diisocyanate or hexamethylene diisocyanate, a dimer or trimer thereof, or a compound having an isocyanate group of an isocyanate compound such as a polyisocyanate compound modified with a polyhydric alcohol such as trimethylolpropane, blocked with a blocking agent such as ε-caprolactam, phenol, benzyl alcohol or methyl ethyl ketone oxime.

The compound having a carboxyl group may, for example, be an aliphatic dibasic acid such as fumaric acid, succinic acid, adipic acid, azelaic acid, sebacic acid or dodecanoic diacid, an acid anhydride such as phthalic anhydride, trimellitic anhydride or pyromellitic anhydride, or a polyester resin or an acrylic resin, which has an acid value.

The compound having a glycidyl group may, for example, be diglycidyl terephthalate, diglycidyl paraoxybenzoate, triglycidyl isocyanate, spyroglycol diglycidyl ether or an alicyclic epoxy resin.

The compound having a hydroxyl group may, for example, be 1,4-bis-2'-hydroxyethoxybenzene, bishydroxyethyl terephthalate, a styrene/allyl alcohol copolymer, spiroglycol, or a polyester or acrylic resin having a hydroxyl value.

Further, dicyandiamide and a dicyandiamide derivative, imidazole and an imidazole derivative, dibasic acid dihydrazide, diaminodiphenylmethane, cyclic amidine or a hydantoin compound, may, for example, be used.

A curing system in the present invention comprises a fluororesin having the above-mentioned crosslinkable sites and the above-mentioned curing agent reactive to such crosslinkable sites. The composition for fluororesin powder coating material of the present invention is a composition for fluororesin powder coating material comprising at least two respectively different curing systems, wherein the respective curing systems substantially independently react and crosslink, and the time required for the relative dynamic viscoelasticity Er' to increase by 5% from the initial value by curing at 190° C. (the crosslinking reaction time) of at least one curing system is different by at least 20 seconds from the crosslinking reaction time of other curing system(s).

In the present invention, the relative dynamic viscoelasticity is measured as follows. Using a rigid body pendulum type viscoelasticity measuring apparatus (manufactured by A & D Co.), the change of the pendulum period is measured. The pendulum period decreases as the crosslinkage density of the thermosetting resin increases. When the pendulum's oscillation period in the measuring system at that time is represented by $T_0$ and the oscillation period at a certain standard point is represented by $T_1$, the relative dynamic viscoelasticity Er' to the standard point, at an oscillation period T, is represented by the following formula:

$$Er'=(1/T^2-1/T_0^2)/(1/T_1^2-1/T_0^2))$$

When the composition for fluororesin powder coating material having the construction defined in the first invention in the present invention, is uniformly coated and baked on an article to be coated, firstly, the curing system having a short crosslinking reaction time, will react to form a crosslinked structure.

Then, in the coating film having a structure formed to some extent, the reaction of another curing system will be initiated, whereby a new crosslinked structure will be formed. However, this is a crosslinking reaction in a body wherein a crosslinked structure has already been formed to some extent, and accordingly, if the new crosslinked structure is formed, the overall structure will be a non-uniform structure having a strain due to the formation of such a new crosslinked structure. Due to such a non-uniform structure, the coating film will be a matte coating film. As the difference in the reaction rate between the combinations of the crosslinkable sites and the curing agents i.e. in the crosslinking reaction time in the present invention, is large, the matte effect will be large.

In the first invention of the present invention, the number average molecular weight ($M_n$) of the fluororesin is preferably at least 5000, more preferably at least 7,000.

If the molecular weight of the fluororesin is less than 5000, the non-uniform structure of the coating film due to the two crosslinking reactions, tends to be hardly formed, and it tends to be difficult to obtain a matte coating film.

Further, the fluorine content in the fluororesin is preferably at least 10 mass %, more preferably at least 15 mass %. Further, it is further preferably from 15 to 40 mass % from the viewpoint of weather resistance, a matte coating film-forming property and a coating operation efficiency.

In the composition for fluororesin powder coating material of the first invention in the present invention, the curing systems are preferably in the following combinations.

(i) A combination in which one curing system comprises a fluororesin having crosslinkable sites a and a curing agent Ha reactive with the crosslinkable sites a, and another curing system comprises a fluororesin having crosslinkable sites b different from a and a curing agent Hb reactive with the crosslinkable sites b, (ii) a combination in which one curing system comprises a fluororesin having crosslinkable sites a and a curing agent H, and another curing system comprises a fluororesin having crosslinkable sites b different from a and the curing agent H, wherein the curing agent H is a curing agent reactive to both crosslinkable sites a and crosslinkable sites b, and (iii) a combination in which one curing agent comprises a fluororesin having crosslinkable sites a and a curing agent Ha having a functional group reactive to crosslinkable sites a, and another curing system comprises a fluororesin having crosslinkable sites a and a curing agent Ha' having a functional group reactive to crosslinkable sites a.

In the above (i) and (ii), fluororesins having mutually different types of crosslinkable sites, i.e. the fluororesin having crosslinkable sites a and the fluororesin having crosslinkable sites b, are employed. Crosslinkable sites a and crosslinkable sites b are different types of functional groups.

Such fluororesins can be obtained by copolymerizing a fluoromonomer (X), a polymerizable monomer (Y) and a monomer (Z) having a functional group which forms a crosslinkable site a or a crosslinkable site (b).

The curing agents to be used in the above (i) are a combination of a curing agent Ha reactive to crosslinkable sites a, and a curing agent Hb reactive to crosslinkable sites b. The curing agent to be used in the above (ii) is a curing agent H which is reactive to both crosslinkable sites a and b.

Further, in the above (iii), the system comprises a fluororesin having crosslinkable sites a and at least two types of curing agents, and each of these curing agents is reactive to crosslinkable sites a. Thus, the reaction rate to crosslinkable sites a of at least one curing agent among said at least two curing agents, is different from the reaction rate to crosslinkable sites a of other curing agent(s).

In the above (i) and (ii), the ratio of the total amount of crosslinkable sites a in the fluororesin having crosslinkable sites a and crosslinkable sites b in the fluororesin having crosslinkable sites b, to the total amount of the curing agents H or the curing agents Ha and Hb, is preferably 1:10, more preferably 0.3:3, by molar ratio of (a+b)/(Ha+Hb).

In the above (iii), the ratio of crosslinkable sites a in the fluororesins, to the total amount of at least two curing agents, is preferably 0.1:10, more preferably 0.3:3, by molar ratio.

In a case where the types of curing agents reactive to the respective crosslinkable sites, are different, it is preferred that the total amounts of the respective crosslinkable sites and the curing agents reactive to such crosslinkable sites, are within the above ranges, respectively.

The fluororesin (A) having hydroxyl groups in the second invention of the present invention, is preferably one having hydroxyl groups, among the above-described fluororesins of the first invention and can be obtained in the same manner as the above-described fluororesins.

The hydroxyl value of the fluororesin (A) is preferably at least 10 mgKOH/g, so that adequate impact resistance can be imparted to the coating film obtainable from the composition for fluororesin powder coating material of the present invention, and is preferably at most 200 mgKOH/g, so that the flexibility of the coating film can be maintained. It is particularly preferably from 25 to 200 mgKOH/g.

The fluororesin (B) having 1,2-epoxy groups (hereinafter referred to simply as epoxy groups) in the third invention of the present invention, is preferably one having glycidyl groups, among the above-described fluororesins of the first invention, and can be obtained in the same manner as the above-described fluororesins.

The epoxy equivalent of the fluororesin (B) is preferably at most 2000 g/eq, so that adequate impact resistance can be imparted to the coating film obtainable from the composition for fluororesin powder coating material of the present invention and is preferably at most 200 g/eq, so that the flexibility of the coating film can be maintained. It is particularly preferably from 450 to 1200 g/eq.

Further, the intrinsic viscosities q of the fluororesin (A) and the fluororesin (B) in tetrahydrofuran at 30° C., are preferably at least 0.1 dl/g so that adequate impact resistance can be imparted to the coating film obtainable from the composition for fluororesin powder coating material of the present invention and are preferably at most 2.0 dl/g so that the flexibility of the coating film can be maintained. They are particularly preferably from 0.1 to 0.8 dl/g. Further, the glass transition temperature ($T_g$) of the fluorinated copolymer, as measured by DSC, is preferably at least 30° C., so that the transparency and solvent resistance of the coating film obtainable from the composition for fluororesin powder coating material of the present invention, are good, and is preferably at most 80° C., so that the transparency of the coating film can be maintained to be good. It is particularly preferably from 35 to 60° C.

The curing agent ($\alpha$) in the present invention may be any curing agent so long as it has a functional group reactive to hydroxyl groups of the fluororesin (A) in the present invention and reacts to present a cured product. Specifically, it may, for example, be a curing agent having at least two isocyanate groups or blocked isocyanate groups, as functional groups. It is particularly preferably a curing agent having at least two blocked isocyanate groups (hereinafter referred to as a blocked polyisocyanate), whereby the curing temperature can easily be adjusted by the dissociation temperature of the blocking agent.

As the blocked polyisocyanate, a known blocked polyisocyanate commercially available for a powder coating material, can be used. Specifically, one comprising isophorone diisocyanate (hereinafter referred to as IPDI) or hexamethylene diisocyanate (hereinafter referred to as HMDI) as the main skeleton and having the isocyanate blocked with epsilon caprolactam (hereinafter referred to as E-CAP), methyl ethyl ketoxime (hereinafter referred to as MEK-OX), methyl isobutyl ketoxime (hereinafter referred to as MIBK-OX) or triazine (hereinafter referred to as TA), or one obtained by coupling isocyanate compounds to each other to form an uretodione bond, may be employed.

As such a blocked polyisocyanate, Vestagon B1530, B1065 or BF1540, tradename, manufactured by Degssa, TPLS2007 or FGB4553, tradename, manufactured by Bayer AG, or Alcure 4470, 4430, 4431 or 4450, manufactured by McWhorter, may, for example, be mentioned.

The curing agent (β) in the present invention may be any curing agent so long as it is capable of reacting to epoxy groups of the fluororesin (B) in the present invention to cure the fluororesin (B). Specifically, a curing agent having at least two functional groups such as amino groups, hydrazide groups, carboxylic groups, carboxylic acid derivative groups or hydroxyl groups, or dicyandiamide, may, for example, be mentioned. Particularly preferred is a curing agent having at least two carboxylic acid groups or hydrazide groups as functional groups, or dicyandiamide.

As specific examples of the curing agent having at leas two functional groups, a dicarboxylic acid such as decanoic dicarboxylic acid, or a dicarboxylic acid dihydrazide such as adipic acid dihydrazide or isophthalic acid dihydrazide, may, for example, be mentioned.

The second invention of the present invention is characterized in that the particles (1) and the particles (2) are different in their curing temperatures by at least 8° C. The curing temperature in the present invention is meant for a temperature at which the heat generation peak based on the reaction between the functional groups of the curing agent (α) and the hydroxyl groups of the fluororesin (A) starts to rise when the particles for the fluororesin powder coating material are measured by a differential scanning calorimetry (DSC) at a temperature raising rate of 10° C./min.

The third invention of the present invention is characterized in that the particles (3) and the particles (4) are different in their curing temperatures by at least 15° C. The curing temperature in the present invention is meant for a temperature at which the heat generation peak based on the curing reaction between the curing agent and the fluororesin starts to rise when the particles (3) and (4) are measured by a differential scanning calorimetry (DSC) at a temperature raising rate of 10° C./min.

Further, it is important that the particles (1) and the particles (2) are substantially independently contained. By such a construction, the coating film surface will be smooth, and at the same time, it is possible to obtain a matte effect. The reason is not necessarily clearly understood, but it is considered that during the formation of the cured coating film, compatibility between the particles (1) and the particles (2) decreases and at the same time due to very fine shrinking action, very fine irregularities may readily be obtained. Further, by changing the blend ratio of the particles (1) and the particles (2), it is possible to optionally adjust the 60° C. specular gloss within a range of from 30 to 60%. In order to obtain such an effect, the above-mentioned difference of the curing temperatures is preferably at least 10° C., particularly preferably at least 12° C.

Also with respect to the particles (3) and the particles (4), it is important that they are substantially independently contained for the same reason as in the case of the above-described particles (1) and the particles (2).

In the present invention, in order to differentiate the above-mentioned curing temperatures, it is necessary to differentiate the combination of the fluororesin (A) and the curing agent (α) in the particles (1) from the combination of the fluororesin (A) and the curing agent (α) in the particles (2). The fluororesins (A) may be the same, while the curing agents are different, or the curing agents (α) may be the same, while the fluororesins (A) are different resins. Of course, both the fluororesins (A) and the curing agents (α) may be different. Preferably, the curing agent (α) in the particles (1) is different from the curing agent (α) in the particles (2). The foregoing will apply to the particles (3) and the particles (4) in the same manner.

Further, it is preferred that the functional group of the curing agent (α) in the particles (1) is a blocked isocyanate group, and the functional group of the curing agent (α) in the particles (2) is a blocked isocyanate group which is different in the reactivity to hydroxyl groups from the blocked isocyanate group of the curing agent (α) in the particles (1). It is particularly preferred that the fluororesins (A) in the particles (1) and the particles (2) are the same resin or resins having the same basic skeleton, the functional group of the curing agent (α) in the particles (1) is a blocked isocyanate group, and the functional group of the curing agent (α) in the particles (2) is a blocked isocyanate group which is different in the reactivity to hydroxyl groups from the blocked isocyanate group of the curing agent (α) in the particles (1).

Such a combination of the blocked isocyanate in the particles (1) and the blocked isocyanate in the particles (2), may, for example, be E-CAP block (or uretodione type) of IPDI and E-CAP block of HMDI, E-CAP block (or uretodione type) of IPDI and MEK-OX block of IPDI, E-CAP block (or uretodione type) of IPDI and TA block of IPDI, E-CAP block (or uretodione type) of IPDI and MEK-OX block of HMDI, E-CAP block (or uretodione type) of IPDI and TA block of HMDI, and E-CAP block (or uretodione type) of IPDI and MIBK-OX block of HMDI.

With respect to the particles (3) and the particles (4), it is preferred that the fluororesins (B) in the particles (3) and the particles (4) are the same resin or resins having the same basic skeleton, the curing agent (β) in the particles (3) is dicyandiamide, and the curing agent (β) in the particles (4) is a curing agent (β) having at least two carboxylic acid groups or hydrazide groups, as functional groups. It is particularly preferred that the fluororesins (B) in the particles (3) and the particles (4) are the same resin or resins having the same basic skeleton, the curing agent (β) in the particles (3) is dicyandiamide, and the curing agent (β) in the particles (4) is a curing agent having at least two hydrazide groups as functional groups.

Now, as an example, the process for producing the composition for fluororesin powder coating material comprising the particles (1) and the particles (2) will be described in detail, but the same will apply also to the composition for fluororesin powder coating material comprising the particles (3) and the particles (4).

In the second invention of the present invention, it is important that particles (1) for fluororesin powder coating material and particles (2) for fluororesin powder coating material, are substantially independently contained. Accordingly, the particles (1) and the particles (2) are usually independently produced. For example, the respective materials are separately roughly mixed by a mixer such as a Henschel mixer, followed by heat melt kneading by a twin screw, single screw or planetary type extruder and by cool rolling by a cool roll. Thereafter, rotary shear pulverization by a pin mill or the like, pulverization by means of an impact type pulverizer such as a jet mill, etc. are carried out. The obtained powders are classified by a mesh or by an air separator or the like to obtain the particles (1) and (2), respectively, as powder compositions. This is a common production process. The particle sizes of the above particles (1) and the particles (2) are not particularly limited, but preferably from 15 to 200 μm, more preferably from 20 to 150 μm, particularly preferably from 20 to 100 μm, as the 50% volume average particle sizes. Here, the 50% volume average particle size is a particle size at the 50% occupying ratio of the total when volume occupying ratios at the respective particle sizes are accumulated.

With the composition for fluororesin powder coating material of the second invention in the present invention, it is possible to obtain a coating film of powder coating material having a controlled gloss value by the ratio of the particles (1) and the particles (2). The ratio of the particles (1) and the particles (2) is preferably such that the mass ratio of particles (1)/particles (2) is preferably from 1/5 to 5/1, particularly preferably from 1/3 to 3/1.

The composition for powder coating material of the present invention is produced by preparing the particles (1) and the particles (2) separately and then the particles (1) and the particles (2) are mixed. Mixing of the particles (1) and the particles (2) is usually carried out by a dry blending method.

In the present invention, "substantially independently contained" includes not only a case where individual particles (1) and particles (2) are independently present in the composition for powder coating material, but also a case where even if individual particles (1) and/or particles (2) are associated or fixed to some extent, they may still behave as independent particles. The latter case of association or fixing to some extent is advantageous in that a problem such that depending upon the coating conditions, individual particles are separately deposited to form a non-uniform coating film, can be avoided.

As a method for associating and fixing individual particles to one another, a method may, for example, be mentioned wherein individual particles (1) and/or particles (2) are granulated in a chamber having an atmosphere of at least the glass transition temperatures (Tg) of the respective particles (1) and particles (2).

To the composition for fluororesin powder coating material of the present invention, additives which are commonly used for powder coating materials may be incorporated. Namely, one or more of additives, for example, an inorganic pigment such as titanium dioxide, red iron oxide, yellow ion oxide or carbon black; an organic pigment such as phthalocyanine blue, phthalocyanine green, quinacridone-type red pigment or isoindolinone type yellow pigment; an extender pigment such as talc, silica or calcium carbonate; a metal powder such as aluminum powder or stainless steel powder; mica powder, an antioxidant, an anti-sagging agent, a leveling agent, an ultraviolet absorber, a photostabilizer, a thermal degradation-preventing agent, a slipping agent, a defoaming agent and a catalyst, may be incorporated as the case requires.

Among the above pigments, a pigment having good weather resistance is preferred so that the resin characteristics of the fluororesin in the present invention can be provided at the maximum level. As such a pigment, a metal oxide pigment such as iron oxide, cobalt oxide, bismuth oxide or surface treated titanium oxide, or an organic pigment such as perylene or diketopyrrolopyrrole may, for example, be mentioned. Further, also an extender pigment or an anti-rusting pigment may, for example, be used in an amount not to impair the weather resistance. As the amount of addition, at most 10 mass %, preferably at most 5 mass %, may be adopted.

The amounts (by mass) of additives other than pigments are suitably selected within a range of from 5 to 150 parts per 100 parts of the fluororesin.

The coating composition for fluororesin powder coating material of the present invention may be uniformly coated on an article to be coated, which is made of iron, aluminum, copper, zinc or an alloy thereof, by means of e.g. a commercially available electrostatic powder coating machine or a fluidized immersion apparatus, followed by baking in an hot air furnace, an infrared furnace or an induction heating furnace to form an excellent matte coating film.

Further, in the present invention, another resin other than the fluororesins, such as a polyester resin, an acrylic resin or an epoxy resin may, for example, be used in combination within a range not to impair the weather resistance performance of the fluororesins. In the second invention and the third invention in the present invention, such another resin, the above pigment, additives other than the above pigment, etc., may be contained in the particles (1), (2), (3) and/or (4), or may be contained in the composition for fluororesin powder coating material of the present invention. In the present invention, an embodiment wherein they are contained in the particles (1), (2), (3) and/or (4), is more preferred.

With the composition for fluororesin powder coating material of the present invention, it is possible to form a smooth and matte type coating film having a superior weather resistance performance, on the surface of various articles. The material for such various articles may, for example, be an inorganic material such as concrete, ALC (autoclaved light weight concrete), GRC (glass fiber-reinforced concrete), CFRC (carbon fiber-reinforced concrete), stone, slate or glass, an organic material such as rubber or a resin such as an acrylic resin, a polycarbonate resin, a vinyl chloride resin or a polyethylene resin, a metal material such as aluminum, copper, bronze, titanium, iron, stainless steel, a zinc steel plate or a steel plate, wood material, or an organic inorganic composite material such as FRP (glass fiber-reinforced synthetic resin) or CFRP (carbon fiber-reinforced synthetic resin).

The composition for fluororesin powder coating material of the present invention may be directly coated on an article made of such a material, or the coating may be carried out after applying surface treatment such as a primer or after applying under coating. In the case of a material where the adhesion tends to be inadequate when directly coated, it is preferred to carry out the coating after applying surface treatment such as sanding or under coating treatment.

The composition for fluororesin powder coating material of the present invention may be coated, for example, on the surface of the following articles.

Such articles may, for example, be transportation instruments such as automobiles, electric cars, helicopters, ships, bicycles, snow vehicles, ropeways, lifts, hovercrafts or motor cycles, building materials such as sashes, shutters, storage tanks, doors, balconies, building external panels, roof materials, stairs, skylights or concrete fences, road materials such as exterior walls of buildings, guard rails, pedestrian walkways, sound insulating walls, signs, express way side walls, elevated railroad tracks or bridges, plant components such as tanks, pipes, towers or chimneys, agricultural installations such as vinyl houses, green houses, silos or agricultural sheets, communication installations such as power poles, power transmission towers or parabola antennas, electric instruments such as electric wiring boxes, light equipments, air conditioners or washing machines, and their coverings, monuments, gravestones, paving materials, wind-proof sheets, water-proof sheets, or curing sheets for construction.

An article having a coating film formed from the composition for fluororesin powder coating material of the present invention has a matte surface presenting a high grade appearance and at the same time maintains a superior weather resistance performance inherent to the fluororesins. For example, it may be uniformly coated on the surface of an article made of a metal material, such as stainless steel, a zinc phosphate-treated steel plate or brass by means of e.g. a commercially available electrostatic powder coating machine or a fluidized dipping apparatus, followed by baking by e.g. a hot air furnace, an infrared furnace or an induction heating furnace, whereby a coating film having an excellent weather resistance performance can be formed.

EXAMPLES

Now, the present invention will be described in further detail with reference to Examples.

Further, in the following Synthesis Examples, Preparation Examples, Working Examples and Comparative Examples, "parts" and "%" mean "parts by mass" and "mass %" unless otherwise specified.

Synthesis Example 1

Into a pressure resistant reactor (pressure resistance: 5.0 MPa) made of stainless steel, equipped with a stirrer and having an internal capacity of 300 mL, 100 g of xylene, 15 g of cyclohexyl vinyl ether (CHVE), 10 g of isobutyl vinyl ether (iBVE), 25 g of 4-hydroxybutyl vinyl ether (HBVE), 1 g of calcium carbonate and 0.07 g of perbutyl perpivalate (PBPV) were charged, and dissolved oxygen in the liquid was removed by solidification/deaeration by liquid nitrogen.

Then, 50 g of chlorotrifluoroethylene (CTFE) was introduced, and the temperature was gradually raised. The reaction was continued while maintaining the temperature at 65° C.

10 Hours later, the reactor was cooled with ice to stop the reaction. This reaction solution was cooled to room temperature, and then unreacted monomers were purged. The obtained reaction solution was filtered through diatomaceous earth to remove solid substances and to obtain a fluorinated copolymer solution A-1 having a solid content concentration of 48% wherein the number average molecular weight of the copolymer was 12,000. 100 Parts of this solution A-1 and 25 parts of adduct B-1530 (ε-caprolactam-blocked isocyanate, manufactured by Hüls Corp, solid content: 100%) as a curing agent were put in a container equipped with a bottom withdrawal tube and mixed for 1 hour until a uniform solution was obtained.

The obtained resin solution was passed through a spray drying apparatus for an organic solvent (Turning type spray dryer, manufactured by Sakamoto Giken K.K.) connected to the bottom withdrawal tube, to obtain a spherical powder coating material having a 50% average particle volume particle size of 15 μm.

The time (the crosslinking reaction time) required for the relative dynamic viscoelasticity E' of this spherical powder coating material at 190° C. as measured by a rigid body pendulum type viscoelasticity measuring apparatus manufactured by A & D Co., to rise by 5% from the initial value, was 120 seconds.

Synthesis Examples 2 to 4

Fluorinated copolymer solutions A-2 to A-4 were obtained in the same manner as in Synthesis Example 1 except that the monomer composition was changed as disclosed in Table 1. These solutions A-2 to A-4 were combined with the curing agents as identified in Table 2 in the amounts (parts) as identified in Table 2 to obtain spherical powder coating materials in the same manner as in Synthesis Example 1. In each case, the 50% average volume particle size was about 15 μm. The crosslinking reaction times as measured in the same manner as in Synthesis Example 1 are shown in Table 2 together with the results of Synthesis Example 1.

TABLE 1

| | | Synthesis Example No. | | | |
|---|---|---|---|---|---|
| | | 1 | 2 | 3 | 4 |
| Monomer composition (%) | CTFE | 50 | 50 | 50 | |
| | TFE | | | | 50 |
| | CHVE | 15 | 15 | 15 | 15 |
| | iBVE | 10 | 10 | | |
| | Vinyl benzoate | | 5 | 10 | 5 |
| | Veova 10 | | 5 | 10 | 25 |
| | HBVE | 25 | 2 | | |
| | GVE | | | 15 | |
| | Undecylenic acid | | | | 5 |
| Solid content concentration (%) | | 48 | 47 | 45 | 44 |
| Number average molecular weight | | 12,000 | 10,000 | 20,000 | 6,000 |
| Fluorinated copolymer solution (identification) | | A-1 | A-2 | A-3 | A-4 |

TFE: Tetrafluoroethylene
CTFE: Chlorotrifluoroethylene
CHVE: Cyclohexyl vinyl ether
EVE: Ethyl vinyl ether
iBVE: Isobutyl vinyl ether
HBVE: 4-Hydroxybutyl vinyl ether
GVE: Glycidyl vinyl ether
Veova 10: Tradename for vinyl ester of branched fatty acid having 9 or 10 carbon atoms, manufactured by Shell Chemical Co.

TABLE 2

| Solutions | A-1 | 100 | | | |
| | A-2 | | 100 | | |
| | A-3 | | | 100 | 100 |
| | A-4 | | | | | 100 |
| Curing agent | Adduct B-1530 | 25 | 5 | | |
| | Dodecanoic diacid | | | 5 | |
| | ADH | | | | 5 |
| | TGIC | | | | | 15 |
| Crosslinking reaction time (sec) | | 120 | 450 | 90 | 115 | 90 |

Adduct B-1530: ε-caprolactam-blocked isophorone diisocyanate, manufactured by Hüls Corp., solid content: 100%
ADH: Adipic acid dihydrazide
TGIC: Triglycidyl isocyanate

Example 1

100 Parts of each of the fluorinated copolymer solutions A-1 and A-3, 25 parts of Adduct B-1530 (ε-caprolactam-blocked isocyanate manufactured by Hüls Corp., solid content: 100%) as a curing agent, 5 parts of dodecanoic diacid, 0.5 part of Modaflow (leveling agent, manufactured by Monsanto Company), 0.5 part of benzoin and 100 parts of titanium dioxide, as additives, and 0.1 part of tridecyl phosphite as an oxidation stabilizer, were put in a container equipped with a bottom withdrawal tube and mixed for 1 hour until a uniform solution was obtained.

The obtained resin solution was passed through a spray drying apparatus for an organic solvent (turning type spray dryer, manufactured by Sakamoto Giken K.K.) connected to the bottom withdrawal tube to obtain a spherical powder coating material having an average particle size of 15 μm.

The obtained powder coating material was electrostatically coated on a zinc phosphate-treated steel plate and cured for 20 minutes in an oven of 180° C. to obtain a coating film.

With respect to the obtained coating film, the physical properties were evaluated. The results are shown in Table 2.

The physical properties were evaluated as follows.

The Surface Matte

The matte degree of the coating film surface was visually evaluated.

○: The matte effect is good.

Δ: The matte effect is inadequate.

X: No matte effect observed.

Weather Resistance

After 3000 hours in a sunshine carbon weather meter, the appearance of the coating film was visually evaluated.

○: No substantial surface deterioration of the coating film observed.

Δ: Surface deterioration of the coating film observed.

X: Substantial surface deterioration and choking were observed.

Appearance of the Coating Film (Smoothness)

The surface state (the seeding state) of the coating film was visually evaluated.

○: No abnormality observed.

Δ: Slight seeding observed.

X: Substantial seeding observed.

Examples 2 to 6 and Comparative Examples 1 to 3

Powder coating materials (average particle size: 15 μm) were obtained in the same manner as in Example 1 except that the components as identified in Table 3 were employed, and the electrostatic coating was carried out in the same manner as in Example 1 except that these coating materials were used, and the physical properties of the obtained coating films were evaluated. The results are shown in Table 3 together with the results of Example 1.

TABLE 3

|  |  | Examples | | | | Comparative Examples | | |
| --- | --- | --- | --- | --- | --- | --- | --- | --- |
|  |  | 1 | 2 | 3 | 4 | 1 | 2 | 3 |
| Fluorinated copolymer solutions | A-1 | 100 | 100 | 100 |  | 200 |  |  |
|  | A-2 |  |  | 100 |  |  |  |  |
|  | A-3 | 100 |  |  | 200 |  | 200 | 200 |
|  | A-4 |  | 100 |  |  |  |  |  |
| Curing agent | Adduct-B 1530 | 25 | 25 | 30 |  | 20 |  |  |
|  | Dodecanoic diacid | 5 |  |  | 8 |  | 10 | 8 |
|  | ADH |  |  |  | 2 |  |  |  |
|  | TGIC |  | 15 |  |  |  |  |  |
| Additives | Modaflow | 0.5 | 0.5 | 0.5 | 0.5 | 0.5 | 0.5 | 0.5 |
|  | Benzoin | 0.5 | 0.5 | 0.5 | 0.5 | 0.5 | 0.5 | 0.5 |
|  | Titanium dioxide | 100 | 100 | 100 | 100 | 100 | 100 | 100 |
| Oxidation stabilizer | Tridecyl phosphite | 0.1 | 0.1 | 0.1 | 0.1 | 0.1 | 0.1 | 0.1 |
| Matting agent | SYSYSIA470 |  |  |  |  |  |  | 10 |
| Coating conditions | Baking temp. (° C.) | 180 | 180 | 180 | 180 | 180 | 180 | 180 |
|  | Baking time (min) | 20 | 20 | 20 | 20 | 20 | 20 | 20 |
| Surface matte |  | ○ | ○ | ○ | ○ | X | X | ○ |
| Weather resistance |  | ○ | ○ | ○ | ○ | ○ | ○ | X |
| Appearance of the coating |  | ○ | ○ | ○ | ○ | ○ | ○ | ○ |

Modaflow: Leveling agent manufactured by Monsanto Company
SYLYSIA470: Silicon dioxide type matting agent, manufactured by Fuji Silysia Chemical Ltd.

As is evident from Table 3, the matte effect can not be obtained by the combination of a single type of crosslinking sites and a single type of curing agent (Comparative Examples 1 and 2), and the weather resistance decreases when a matting agent is incorporated. Whereas, in a case where the composition of the present invention is used, it is evident that the matte effect can be obtained without deteriorating the weather resistance or the coating appearance.

Synthesis Example 5

Into a pressure resistant reactor made of stainless steel, having an internal capacity of 3000 mL and equipped with a stirrer, 1000 g of xylene, 350 g of cyclohexyl vinyl ether (CHVE), 50 g of ethyl vinyl ether (EVE), 100 g of 4-hydroxybutyl vinyl ether (HBVE), 10 g of calcium carbonate and 0.7 g of perbutyl perpivalate (PBPV) were charged, and dissolved oxygen in the liquid was removed by solidification/deaeration by liquid nitrogen. Then, 500 g of chlorotrifluoroethylene (CTFE) was introduced, and then, the temperature was gradually raised. The polymerization reaction was carried out while maintaining the temperature at 65° C. 10 Hours later, the reactor was cooled with water to stop the reaction. This reaction solution was cooled to room temperature, and then unreacted monomers were purged. The obtained reaction solution was filtered through diatomaceous earth to remove non-dissolved solid substances and to obtain a solution of fluorinated copolymer A having a solid content concentration of 50%. This solution was subjected to drying under reduced pressure to obtain a solid fluorinated copolymer A. The glass transition temperature of the fluorinated copolymer A was 55%, and the hydroxyl value was 38 mgKOH/g.

Synthesis Example 6

Into a pressure resistant reactor made of stainless steel, having an internal capacity of 3000 mL and equipped with a stirrer, 1000 g of xylene, 447 g of cyclohexyl vinyl ether (CHVE), 145 g of glycidyl vinyl ether (GVE), 10 g of calcium carbonate and 0.7 g of perbutyl perpivalate (PBPV) were charged, and dissolved oxygen in the liquid was removed by solidification/deaeration by liquid nitrogen. Then, 583 g of trichlorofluoroethylene (CTFE) was introduced, and. then, the temperature was gradually raised. The polymerization reaction was carried out while maintaining the temperature at 65° C. 10 Hours later, the reactor was cooled with water to stop the reaction. This reaction solution was cooled to room temperature, and then, unreacted monomers were purged, and the obtained reaction solution was filtered through diatomaceous earth to remove non-dissolved solid substances and to obtain a solution of a fluorinated copolymer B having a solid content concentration of 50%. This solution was subjected to drying under reduced pressure to obtain a solid fluorinated copolymer B. The glass transition temperature of the fluorinated copolymer B was 55° C., and the epoxy equivalent was 800 g/eq.

Preparation Example 1

580 g of the fluorinated copolymer A, 110 g of Creanova B1530 (tradename for a polyisocyanate resin comprising IPDI as the main skeleton and blocked with E-CAP, manufactured by Degssa) (NCO in the polyisocyanate resin/OH in the fluorinated copolymer A=1.0), 4 g of benzoin, 10 g of BYK-364P (tradename for an acrylic acid oligomer type leveling agent, manufactured by BYK-Chemie) and 300 g of titanium dioxide (R960, tradename, manufactured by DuPont) were put into a high speed mixer and mixed for 1 minute, followed by kneading by a twin screw kneader (manufactured by Prism) adjusted to a temperature of 120° C. The discharged kneaded product was rolled by a cool roll and then crushed by a jaw crusher, then pulverized by means of a pin mill, and classified by a 150 mesh net to obtain particles a-1 for fluororesin powder coating material having a 50% volume average particle size of 35 μm. The particles a-1 were analyzed by a differential thermal analysis apparatus (DSC/220C, manufactured by Seiko Instruments Inc.), whereby the rising temperature of the heat generation peak based on the reaction of an isocyanate and a hydroxyl group (the reaction initiation temperature) was 170° C. Further, the crosslinking reaction time of the particles a-1 was measured in the same manner as disclosed in Example 1 and found to be 80 seconds.

Preparation Example 2

585 g of the fluorinated copolymer A, 115 g of TPLS2122 (tradename for a polyisocyanate resin comprising HMDI as the main skeleton and blocked with E-CAP, manufactured by Bayer). (NCO in the polyisocyanate resin/OH in the fluorinated copolymer A=1.0), 4 g of benzoyl, 10 g of BYK-364P (tradename for an acrylic acid oligomer type leveling agent, manufactured by BYK-Chemie) and 300 g of titanium dioxide (R960, tradename, manufactured by DuPont) were treated in the same manner as in Preparation Example 1 to obtain particles a-2 for fluororesin powder coating material having a 50% volume average particle size of 35 μm. The reaction initiation temperature of the particles a-2 was measured in the same manner as in Preparation Example 1 and found to be 155° C. Further, the crosslinking reaction time of the particles a-2 was measured in the same manner as disclosed in Example 1 and found to be 55 seconds.

Preparation Example 3

650 g of the fluorinated copolymer B, 40 g of adipic acid dihydrazide, 4 g of benzoin, 10 g of BYK-364P (tradename for an acrylic acid oligomer leveling agent, manufactured by BYK-Chemie) and 280 g of titanium dioxide (R960, tradename, manufactured by DuPont) were put in a high speed mixer and mixed for 1 minute, followed by kneading in a twin screw kneader (manufactured by Prism) having the temperature adjusted at 120° C. The discharged kneaded product was rolled by a cool roller, followed by crushing by a jaw crusher, and then pulverized by means of a pin mill and classified by a 150 mesh net to obtain particles b-1 having a 50% volume average particle size of 35 μm. The particles b-1 were analyzed by a differential thermal analysis apparatus (DSC/220C, manufactured by Seiko Instruments Inc.), whereby the rising temperature of the heat generation peak based on the reaction of a hydrazide group and an epoxy group (the reaction initiation temperature) was 160° C. Further, the crosslinking reaction time of the particles b-1 was measured in the same manner as disclosed in Example 1 and found to be 65 seconds.

Preparation Example 4

650 g of the fluorinated copolymer B, 33 g of dicyandiamide, 4 g of benzoin, 10 g of BYK-364P (tradename for an acrylic acid oligomer type leveling agent, manufactured by BYK-Chemie) and 280 g of titanium dioxide (R960, tradename, manufactured by DuPont) were treated in the same manner as in Preparation Example 3 to obtain particles b-2 having a 50% volume average particle size of 34 μm. The reaction initiation temperature of the particles b-2 was measured in the same manner as in Preparation Example 3 and found to be 180° C. Further, the crosslinking reaction time of the particles b-2 was measured in the same manner as disclosed in Example 1 and found to be 95 seconds.

Example 5

150 g of the above particles a-1 for fluororesin powder coating material and 150 g of the above particles a-2 for fluororesin powder coating material were uniformly mixed for 30 seconds by a centrifugal mixer to prepare a composition C for fluororesin powder coating material. The composition C thus obtained was coated on the surface of a chromate-treated aluminum plate at an applied voltage of −80 kv by means of a powder electrostatic coating apparatus (GX electrostatic coating machine manufactured by Nihon Parkerizing Co., Ltd.) so that the coated film thickness would be 50 μm, followed by baking. Here, the baking was carried out for 20 minutes in an atmosphere of 200° C. by means of a hot air circulation system dryer. As the evaluation of the coating film, visual evaluation of the coating film surface in the same manner as in Example 1 and measurement of a 60° specular gloss value were carried out. Further, as evaluation of the weather resistance, the gloss maintaining rate of the coating film after 3000 hours of an accelerated weather resistance test by a Sunshine Weather-O-Meter, was measured. The evaluation results are summarized in Table 4.

Example 6

A composition D for fluororesin powder coating material was prepared in the same manner as in Example 5 except that in Example 5, the amount of the particles a-1 for fluororesin powder coating material was changed to 100 g, and the amount of the particles a-2 for fluororesin powder coating material was changed to 200 g. From the composition D, a coating film was prepared in the same manner as in Example 5, and evaluation of the coating film was carried out. The evaluation results are summarized in Table 4.

Example 7

A composition E for fluororesin powder coating material was prepared in the same manner as in Example 5 except that in Example 5, the amount of the particles a-1 for fluororesin powder coating material was changed to 200 g, and the amount of the particles a-2 for fluororesin powder coating material was changed to 100 g. From the composition E, a coating film was prepared in the same manner as in Example 5, and evaluation of the coating film was carried out. The evaluation results are summarized in Table 4.

Comparative Example 4

A coating film was prepared and evaluation of the coating film was carried out, in the same manner as in Example 5 except that 300 g of the above particles a-1 for fluororesin powder coating material were used alone as the composition for fluororesin powder coating material. The evaluation results are summarized in Table 4.

Comparative Example 5

A coating film was prepared and evaluation of the coating film was carried out, in the same manner as in Example 5 except that 300 g of the above particles a-2 for fluororesin powder coating material, were used alone as the composition for fluororesin powder coating material. The evaluation results are summarized in Table 4.

Comparative Example 6

In addition to the one put into the high speed mixer in Preparation Example 1, 10 g of S-380N1 (tradename for Amide Wax type matte agent, manufactured by Shamlock) was put together into the high speed mixer and treated in the same manner as in Preparation Example 1, to obtain particles a-3 for fluororesin powder coating material having a 50% volume average particle size of 36 μm. A coating film was prepared and evaluation of the coating film was carried out, in the same manner as in Example 5, except that 300 g of the particles a-3 for fluororesin powder coating material were used alone as the composition for fluororesin powder coating material. The evaluation results are summarized in Table 4.

Comparative Example 7

Particles a-4 for fluororesin powder coating material having a 50% volume average particle size of 35 μm were obtained in the same manner as in Comparative Example 3 except that 100 g of calcium carbonate was used as a matte agent instead of S-380N1 in Comparative Example 6. A coating film was prepared and evaluation of the coating film was carried out, in the same manner as in Example 5 except that 300 g of the particles a-4 for fluororesin powder coating material were used alone as the composition for fluororesin powder coating material. The evaluation results are summarized in Table 4.

TABLE 4

|  | Ex. 5 | Ex. 6 | Ex. 7 | Comp. Ex. 4 | Comp. Ex. 5 | Comp. Ex. 6 | Comp. Ex. 7 |
| --- | --- | --- | --- | --- | --- | --- | --- |
| Composition for powder coating material | C | D | E | Particles a-1 alone | Particles a-2 alone | Particles a-3 alone | Particles a-4 alone |
| Appearance of the coating film | ○ | ○ | ○ | ○ | ○ | X | ○ |
| 60° specular gloss (%) | 45 | 60 | 37 | 80 | 82 | 40 | 81 |
| Evaluation of weather resistance (%) | 95 | 93 | 91 | 90 | 93 | 65 | 61 |

Example 8

150 g of the above particles b-1 and 150 g of the above particles b-2 were uniformly mixed for 30 seconds by a centrifugal mixer to obtain a composition F for fluororesin powder coating material. The composition F was coated on the surface of a chromate-treated aluminum plate at an applied voltage of −80 kv by means of a powder electrostatic coating apparatus (GX electrostatic coating machine manufactured by Nihon Parkerizing Co., Ltd.) so that the coating film thickness would be 50 μm, followed by baking. Here, the baking was carried out in an atmosphere of 200° C. for 20 minutes by means of a hot air circulation dryer. Evaluation of the coating film was carried out by visual evaluation of the coating film surface in the same manner as in Example 1 and by measuring the 60° specular gloss value. Further, for evaluation of the weather resistance, the gloss-maintaining rate of the coating film after 3000 hours of an accelerated weather resistance test by a Sunshine Weather-O-Meter, was measured. The evaluation results are summarized in Table 5.

Example 9

A composition G for fluororesin powder coating material was prepared in the same manner as in Example 8 except that in Example 8, the amount of the particles b-1 was changed to 200 g, and the amount of the particles b-2 was changed to 100 g. From the composition G, a coating film was prepared, and evaluation of the coating film was carried out, in the same manner as in Example 8. The evaluation results are summarized in Table 5.

Example 10

A composition H for fluororesin powder coating material was prepared in the same manner as in Example 8 except that in Example 8, the amount of the particles b-1 was changed to 100 g, and the amount of the particles b-2 was changed to 200 g. From the composition H, a coating film was prepared and evaluation of the coating film was carried out, in the same manner as in Example 8. The evaluation results are summarized in Table 5.

Comparative Example 8

A coating film was prepared and evaluation of the coating film was carried out, in the same manner as in Example 5 except that 300 g of the particles b-1 were used alone as the composition for fluororesin powder coating material. The evaluation results are summarized in Table 5.

Comparative Example 9

A coating film was prepared and evaluation of the coating film was carried out, in the same manner as in Example 8, except that 300 g of the particles b-2 were used alone as the composition for fluororesin powder coating material. The evaluation results are summarized in Table 5.

Comparative Example 10

In addition to the one put into the high speed mixer in Preparation Example 3, 10 g of S-380N1 (tradename for Amide Wax type matting agent, manufactured by Shamlock) was further put together into the high speed mixer, followed by the same treatment as in Preparation Example 3 to obtain particles b-3 having a 50% volume average particle size of 36 μm. A coating film was prepared and evaluation of the coating film was carried out in the same manner as in Example 8 except that 300 g of such particles b-3 were used alone as the composition for fluororesin powder coating material. The evaluation results are summarized in Table 5.

Comparative Example 11

Particles b-4 having a 50% volume average particle size of 35 μm were obtained by the same treatment as in Comparative Example 8 except that instead of S-380N1 in Comparative Example 10, 100 g of calcium carbonate was used as the matting agent. A coating film was prepared and evaluation of the coating film was carried out, in the same manner as in Example 8 except that 300 g of such particles b-4 were used alone as the composition for fluororesin powder coating material. The evaluation results are summarized in Table 5.

TABLE 5

| | Ex. 8 | Ex. 9 | Ex. 10 | Comp. Ex. 8 | Comp. Ex. 9 | Comp. Ex. 10 | Comp. Ex. 11 |
|---|---|---|---|---|---|---|---|
| Composition for powder coating material | F | G | H | Particles b-1 alone | Particles b-2 alone | Particles b-3 alone | Particles b-4 alone |
| Appearance of the coating film | ○ | ○ | ○ | ○ | ○ | X | ○ |
| 60° specular gloss (%) | 45 | 35 | 60 | 80 | 82 | 50 | 40 |
| Evaluation of weather resistance (%) | 95 | 93 | 91 | 90 | 93 | 65 | 61 |

INDUSTRIAL APPLICABILITY

According to the present invention, it is possible to obtain a composition for fluororesin powder coating material which is capable of forming a coating film of matte type, which is smooth on the coating film surface and capable of presenting a high grade appearance, while maintaining a superior weather resistance performance of fluororesins. Further, it is possible to optionally adjust the 60° specular gloss as a matting index within a range of from 30% to 60%.

The entire disclosures of Japanese Patent Application No. 2001-295296 filed on Sep. 27, 2001, Japanese Patent Application No. 2001-384426 filed on Dec. 18, 2001 and Japanese Patent Application No. 2001-391622 filed on Dec. 25, 2001 including specifications, claims and summaries are incorporated herein by reference in their entireties.

What is claimed is:

1. A composition for fluororesin powder coating material, which comprises at least two curing systems each comprising a fluororesin having crosslinkable sites and a curing agent reactive to the crosslinkable sites, wherein the respective curing systems substantially independently react and crosslink, and the time required for the relative dynamic viscoelasticity Er' to increase by 5% from the initial value by curing at 190° C. (the crosslinking reaction time) of at least one curing system is different by at least 20 seconds from the crosslinking reaction time of other curing system(s).

2. The composition for fluororesin powder coating material according to claim 1, wherein one curing system comprises a fluororesin having crosslinkable sites a and a curing agent Ha reactive to the crosslinkable sites a, and another curing system comprises a fluororesin having crosslinkable sites b different from a and a curing agent Hb reactive to crosslinkable sites b.

3. The composition for fluororesin powder coating material according to claim 1, wherein one curing system comprises a fluororesin having crosslinkable sites a and a curing agent H, and another curing system comprises a fluororesin having crosslinkable sites b different from a and the curing agent H, wherein the curing agent H is a curing agent reactive to both the crosslinkable sites a and the crosslinkable sites b.

4. The composition for fluororesin powder coating material according to claim 1, wherein one curing system comprises a fluororesin having crosslinkable sites a and a curing agent Ha having a functional group reactive to the crosslinkable sites a, and another curing system comprises a fluororesin having crosslinkable sites a and a curing agent Ha' having a functional group reactive to crosslinkable sites a.

5. A composition for fluororesin powder coating material, which comprises the following particles (1) and the following particles (2), wherein the particles (1) and the particles (2) are different in their curing temperatures by at least 8° C., and the particles (1) and the particles (2) are substantially independently contained:

The particles (1) are particles for fluororesin powder coating material comprising a fluororesin (A) having hydroxyl groups and a curing agent (α) having a functional group reactive to the hydroxyl groups; and the particles (2) are particles for fluororesin powder coating material comprising a fluororesin (A) having hydroxyl groups and a curing agent (α) having a functional group reactive to the hydroxyl groups, wherein the combination of the fluororesin (A) and the curing agent (α) is different from the combination in the particles (1);

provided that here the curing temperature is meant for a temperature at which the heat generation peak based on the reaction between the functional groups of the curing agent (α) and the hydroxyl groups of the fluororesin (A) starts to rise by the differential scanning calorimetry (DSC) of the particles for fluororesin powder coating material.

6. The composition for fluororesin powder coating material according to claim 5, wherein the functional groups of the curing agent (α) in the particles (1) are blocked isocyanate groups, and the functional groups of the curing agent (α) in the particles (2) are blocked isocyanate groups which are different in the reactivity to hydroxyl groups from the blocked isocyanate groups of the curing agent (α) in the particles (1).

7. A composition for fluororesin powder coating material, which comprises the following particles (3) and the following particles (4), wherein the particles (3) and the particles (4) are different in their curing temperatures by at least 15° C., and the particles (3) and the particles (4) are substantially independently contained:

The particles (3) are particles comprising a fluororesin (B) having 1,2-epoxy groups and a curing agent (β) capable of curing the fluororesin (B); and the particles (4) are particles comprising a fluororesin (B) having 1,2-epoxy groups and a curing agent (β) capable of curing the fluororesin (B), wherein the combination of the fluororesin (B) and the curing agent (β) is different from the combination in the particles (3);

provided that here the curing temperature is meant for a temperature at which the heat generation peak based on the curing reaction between the curing agent (β) and the fluororesin (B) starts to rise by the differential scanning calorimetry (DSC) of the particles (3) and (4).

8. A process for producing a composition for fluororesin powder coating material, which comprises preparing the following particles (1) and the following particles (2) independently and then, mixing the particles (1) and the particles (2):

The particles (1) are particles for fluororesin powder coating material comprising a fluororesin (A) having hydroxyl groups and a curing agent (α) having a functional group reactive to the hydroxyl groups; and the particles (2) are particles for fluororesin powder coating material comprising a fluororesin (A) having hydroxyl groups and a curing agent (α) having a functional group reactive to the hydroxyl groups, wherein the combination of the fluororesin (A) and the curing agent (α) is different from the combination in the particles (1);

provided that here the curing temperature is meant for a temperature at which the heat generation peak based on the reaction between the functional groups of the curing agent (α) and the hydroxyl groups of the fluororesin (A) starts to rise by the differential scanning calorimetry (DSC) of the particles for fluororesin powder coating material.

9. A process for producing a composition for fluororesin powder coating material, which comprises preparing the following particles (3) and the following particles (4) independently and then, mixing the particles (3) and the particles (4):

The particles (3) are particles comprising a fluororesin (B) having 1,2-epoxy groups and a curing agent (β) capable of curing the fluororesin (B); and the particles (4) are particles comprising a fluororesin (B) having 1,2-epoxy groups and a curing agent (β) capable of curing the fluororesin (B), wherein the combination of the fluororesin (B) and the curing agent (β) is different from the combination in the particles (3);

provided that here the curing temperature is meant for a temperature at which the heat generation peak based on the curing reaction between the curing agent (β) and the fluororesin (B) starts to rise by the differential scanning calorimetry (DSC) of the particles (3) and (4).

10. An article having a coating film, wherein the coating film is a coating film formed from the composition for coating material as defined in claim 1.

* * * * *